UNITED STATES PATENT OFFICE.

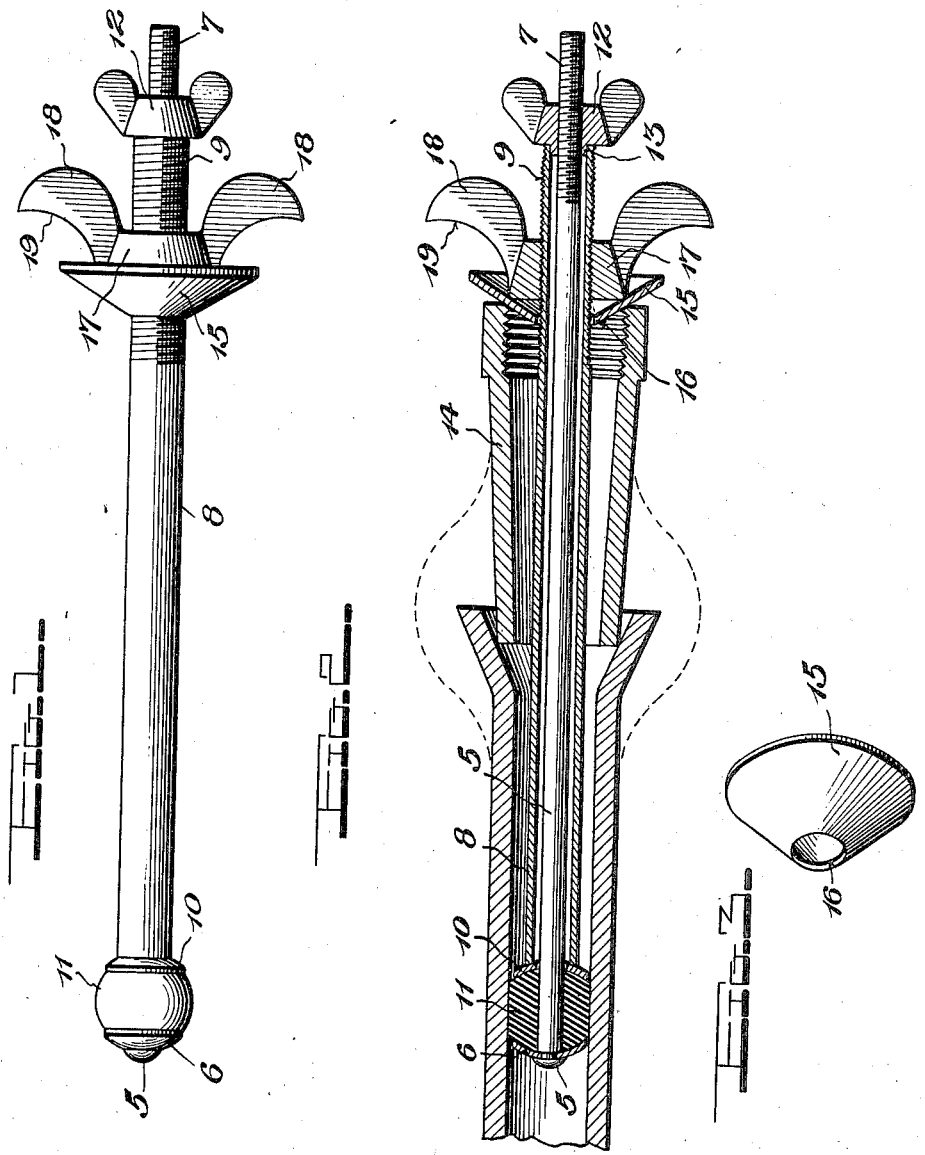

HUGH H. HARRIS, OF ALEXANDRIA, VIRGINIA.

PLUMBING APPLIANCE.

1,226,209.

Specification of Letters Patent.

Patented May 15, 1917.

Application filed August 3, 1916. Serial No. 112,954.

*To all whom it may concern:*

Be it known that I, HUGH HAMILTON HARRIS, a citizen of the United States, and a resident of Alexandria, in the county of Alexandria and State of Virginia, have invented a new and useful Improvement in Plumbing Appliances, of which the following is a specification.

This invention is an improvement in plumbing appliances and has particular reference to a device employed in making repairs to broken pipes and the like.

The method now commonly employed, by those skilled in the art, in repairing breaks in water pipes is to first "freeze" the pipe so as to prevent the flow of water and then solder the joint. This is known to be an inconvenient and uncertain process in that much time and labor is unnecessarily expended and the flow of water cannot always be effectively stopped. Also, when thimbles or couplings are used in forming the joint, it is difficult to maintain the same in alinement with the pipe to be repaired in order to insure a straight joint.

The present invention is designed to overcome the above difficulties by providing a device or tool consisting of relatively adjustable members for compressing an expansible element which is adapted to effectively plug the pipe beyond the break and thus stop the flow of water, one of said relatively adjustable members having mounted thereon a longitudinally movable centering and alining element which engages the thimble or coupling in order to properly position the same relative to the pipe to be repaired.

Another object is the provision of a device of this character which is extremely simple in construction, thus reducing the cost of manufacture to a minimum, and which is effective in carrying out the purpose for which it is designed.

The inventive idea involved is capable of receiving a variety of mechanical expressions, one of which, for the purpose of illustrating the invention, is shown in the accompanying drawing, wherein—

Figure 1 is a side elevation of the device constructed in accordance with the invention.

Fig. 2 is a longitudinal section showing the application thereof.

Fig. 3 is a detail perspective view of the centering and alining element employed in connection with the invention.

There is illustrated in the accompanying drawing what is now believed to be a preferred form of the invention wherein the numeral 5 indicates an elongated rod having a washer 6 secured to one extremity while its other end is screw threaded as shown at 7. A hollow longitudinally adjustable sleeve member 8 is mounted upon the rod 5 in spaced relation and is also exteriorly screw-threaded upon its outer end, or that end adjacent the screw threads 7, as indicated at 9. The inner or opposite end of said sleeve member preferably carries a washer 10 similar to the washer 6 and said washers have interposed therebetween an expansible element 11, preferably made of rubber. A small wing nut 12 is mounted upon the end 7 of the rod 5 and has a flange 13 adapted to engage the interior of the sleeve member 8 when the said nut is in contact with the adjacent end thereof. From this description it will be apparent that by adjusting the wing nut 12 the sleeve member 8 may be moved longitudinally of the rod 5 and cause the expansible element 11 to be compressed between the washers 6 and 10 and thereby tightly engage the interior of a pipe.

In making new joints, a thimble 14 is employed and is first mounted over the sleeve member 8 before the latter is inserted into a pipe, and then has one end projected into the broken end of the pipe which has been previously flared by hammering, as is usual. It now becomes necessary to center the thimble and aline the same in order to make a straight joint and, to this end, the sleeve member 8 preferably has loosely mounted thereon a frusto conical element 15 in the form of a plate having a central opening 16 for receiving said sleeve 8. The small end of the plate 15 preferably extends in the direction of the expansible element 11 and is adapted to be projected into the adjacent end of the thimble 14 by means of a large wing nut 17 mounted upon the screw threads 9 of the sleeve 8. By thus operating the element 15 until the same engages the entire inner circumference of the said end of the thimble 14 it will be apparent that said thimble will be adjusted so that the same will be centered and the longitudinal axis thereof in substantial alinement with that of the pipe.

The wing nut 17 is preferably made larger than the nut 12 and has its wings 18 provided with concaved gripping edges 19 whereby the operator may secure a firm hold upon said wings and thus extract the device from the pipe. The ready and quick withdrawal of the device may also be effected by simply unscrewing the nut 12 whereupon the pressure of the water will force the entire device outwardly.

What is claimed is:—

1. A device of the class described comprising relatively adjustable members, an expansible element controlled by said members and adapted to be inserted into a pipe whereby to plug the same, and means for alining a thimble and retaining the same alined with said pipe, whereby the longitudinal axes of said members, said pipe and said thimble will coincide.

2. A device of the class described comprising relatively adjustable members, an expansible element controlled by said members and adapted to be inserted into a pipe whereby to plug the same, and means carried by one of said adjustable members for alining a thimble and retaining the same alined with said pipe, whereby the longitudinal axes of said members, said pipe and said thimble will coincide.

3. A device of the class described comprising relatively adjustable members, an expansible element controlled by said members, and a frusto-conical plate adjustable longitudinally of said relatively adjustable members for alining and centering a thimble with a pipe to be repaired.

4. A device of the class described comprising relatively adjustable members, an expansible element controlled by said members, and a frusto-conical plate adjustable longitudinally of said relatively adjustable members for alining and centering a thimble with a pipe to be repaired and having a central opening for receiving said members.

5. A device of the class described comprising relatively adjustable members, an expansible element controlled by said members, means adjustable longitudinally of said relatively adjustable members for alining and centering a thimble with a pipe to be repaired, and means carried by one of said adjustable members for adjusting the first named means.

6. A device of the class described comprising a rod, a sleeve member surrounding the same and adjustable longitudinally thereof, an expansible element adapted to be compressed by the adjustment of said sleeve member whereby to plug a pipe, and a frusto-conical element slidable on said sleeve member and adapted to engage one end of a thimble whereby to center and aline the same with said pipe.

7. A device of the class described comprising a rod, a sleeve member surrounding the same and adjustable longitudinally thereof, an expansible element adapted to be compressed by the adjustment of said sleeve member whereby to plug a pipe, a frusto-conical element slidable on said sleeve member and adapted to engage one end of a thimble whereby to center and aline the same with said pipe, and a wing nut adjustable on said sleeve member for moving said frusto-conical element to its centering and alining position.

8. A device of the class described comprising an expansible element, means for expanding the same, adjustable means carried by said expanding means for alining and centering a thimble with a pipe to be repaired, and means for adjusting and retaining the last named means in position.

HUGH H. HARRIS.